(12) United States Patent
Yamasaki

(10) Patent No.: US 11,034,089 B2
(45) Date of Patent: Jun. 15, 2021

(54) PLASTICIZING DEVICE AND THREE-DIMENSIONAL SHAPING DEVICE

(71) Applicant: Seiko Epson Corporation, Tokyo (JP)

(72) Inventor: Keigo Yamasaki, Shiojiri (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 16/580,027

(22) Filed: Sep. 24, 2019

(65) Prior Publication Data

US 2020/0094480 A1    Mar. 26, 2020

(30) Foreign Application Priority Data

Sep. 25, 2018   (JP) .............................. JP2018-178937

(51) Int. Cl.
*B29C 64/314*     (2017.01)
*B29C 64/209*     (2017.01)
(Continued)

(52) U.S. Cl.
CPC .......... *B29C 64/314* (2017.08); *B29C 64/209* (2017.08); *B29C 64/241* (2017.08);
(Continued)

(58) Field of Classification Search
CPC ... B29C 48/175; B29C 48/301; B29C 48/302; B29C 48/3366; B29C 48/338;
(Continued)

(56) References Cited

U.S. PATENT DOCUMENTS 3,355,764 A * 12/1967 Moyer .................... B29C 48/47
425/587
3,790,328 A   2/1974 Maxwell
(Continued)

FOREIGN PATENT DOCUMENTS

JP    H03-153311 A    7/1991
JP    H05-138756 A    6/1993
(Continued)

OTHER PUBLICATIONS

Extended European Search Report for Patent Application No. EP 19199603.2 dated Jan. 29, 2020 (8 pages).

*Primary Examiner* — Xiao S Zhao
*Assistant Examiner* — Emmanuel S Luk
(74) *Attorney, Agent, or Firm* — Harness, Dickey & Pierce, P.L.C.

(57) ABSTRACT

A plasticizing device includes: a drive motor; a rotating unit driven to rotate about a rotation axis by the drive motor and having an end surface perpendicular to the rotation axis and a lateral surface intersecting with the end surface; a barrel having a bottom surface facing the end surface of the rotating unit, and a heater; a case accommodating the rotating unit; and a material supply unit accommodating the material. At least one of the barrel and the case has a sidewall surface facing the lateral surface of the rotating unit and standing up along an outer circumference of the bottom surface of the barrel. At the bottom surface of the barrel, a communication hole through which the molten material flows out and a spiral groove part coupled to the communication hole are formed. The lateral surface of the rotating unit and the sidewall surface together define a supply space where the material is supplied from the material supply unit to the groove part.

7 Claims, 7 Drawing Sheets

(51) Int. Cl.
  *B29C 64/241* (2017.01)
  *B29C 64/255* (2017.01)
  *B29C 64/245* (2017.01)
  *B33Y 30/00* (2015.01)
  *B33Y 40/00* (2020.01)

(52) U.S. Cl.
  CPC .......... *B29C 64/245* (2017.08); *B29C 64/255* (2017.08); *B33Y 30/00* (2014.12); *B33Y 40/00* (2014.12)

(58) Field of Classification Search
  CPC .................. B29C 45/164; B29C 45/22; B29C 2045/2779; B29C 64/314
  See application file for complete search history.

(56) References Cited

U.S. PATENT DOCUMENTS

| | | | | |
|---|---|---|---|---|
| 4,553,922 | A * | 11/1985 | Winner | B01F 7/00816 425/381.2 |
| 6,077,062 | A * | 6/2000 | Guillemette | B29C 48/34 425/113 |
| 10,800,083 | B2 * | 10/2020 | Zhu | B29C 45/46 |
| 2017/0210069 | A1 | 7/2017 | Stubenruss | |
| 2018/0326658 | A1 * | 11/2018 | Saito | B33Y 50/02 |
| 2019/0061243 | A1 * | 2/2019 | Saito | B29C 64/106 |
| 2019/0160746 | A1 * | 5/2019 | Anegawa | B29C 64/209 |
| 2019/0248069 | A1 * | 8/2019 | Anegawa | B29C 64/188 |
| 2019/0255762 | A1 * | 8/2019 | Mizukami | B29C 64/106 |
| 2019/0255772 | A1 * | 8/2019 | Mizukami | B29C 64/106 |
| 2019/0283321 | A1 * | 9/2019 | Mizukami | B33Y 30/00 |
| 2019/0358903 | A1 * | 11/2019 | Watanabe | B22F 3/1055 |
| 2020/0016832 | A1 * | 1/2020 | Yuwaki | B01D 29/05 |
| 2020/0016833 | A1 * | 1/2020 | Yuwaki | B33Y 30/00 |
| 2020/0016834 | A1 * | 1/2020 | Yuwaki | B29C 64/209 |
| 2020/0031037 | A1 * | 1/2020 | Hideshima | B29C 45/60 |
| 2020/0061914 | A1 * | 2/2020 | Onishi | B33Y 50/02 |
| 2020/0094476 | A1 * | 3/2020 | Yamasaki | B29C 64/255 |
| 2020/0101661 | A1 * | 4/2020 | Sasagawa | B22F 3/225 |
| 2020/0101672 | A1 * | 4/2020 | Watanabe | B29C 64/241 |
| 2020/0114582 | A1 * | 4/2020 | Hideshima | B29C 64/209 |
| 2020/0122407 | A1 * | 4/2020 | Yamazaki | B29C 64/118 |
| 2020/0139629 | A1 * | 5/2020 | Yokota | B22F 3/008 |
| 2020/0164589 | A1 * | 5/2020 | Yuwaki | B29C 64/393 |
| 2020/0171745 | A1 * | 6/2020 | Yuwaki | B33Y 50/02 |
| 2020/0207016 | A1 * | 7/2020 | Anegawa | B29C 64/118 |
| 2020/0207017 | A1 * | 7/2020 | Yuwaki | B29C 64/241 |
| 2020/0238611 | A1 * | 7/2020 | Watanabe | B33Y 10/00 |
| 2020/0238612 | A1 * | 7/2020 | Watanabe | B33Y 30/00 |
| 2020/0269502 | A1 * | 8/2020 | Anegawa | B22F 3/24 |
| 2020/0269515 | A1 * | 8/2020 | Takahashi | B29C 64/209 |
| 2020/0307082 | A1 * | 10/2020 | Yuwaki | B29C 64/393 |
| 2020/0307091 | A1 * | 10/2020 | Kobayashi | B33Y 30/00 |
| 2020/0307093 | A1 * | 10/2020 | Yuwaki | B29C 64/209 |

FOREIGN PATENT DOCUMENTS

| | | |
|---|---|---|
| JP | 2007-245503 A | 9/2007 |
| JP | 2009-137260 A | 6/2009 |
| JP | 2009-269182 A | 11/2009 |
| JP | 2009-269183 A | 11/2009 |
| JP | 2009-285879 A | 12/2009 |
| JP | 2010-000752 A | 1/2010 |
| JP | 2010-052264 A | 3/2010 |
| JP | 2010-208051 A | 9/2010 |
| JP | 2010-214839 A | 9/2010 |
| JP | 2010-241016 A | 10/2010 |
| JP | 2011-020378 A | 2/2011 |
| JP | 2014-237300 A | 12/2014 |
| WO | WO-2007-119533 A1 | 10/2007 |
| WO | WO-2008-100467 A1 | 8/2008 |
| WO | WO-2016-020150 A1 | 2/2016 |

* cited by examiner

PLASTICIZING DEVICE AND THREE-DIMENSIONAL SHAPING DEVICE

The present application is based on, and claims priority from, JP Application Serial Number 2018-178937, filed Sep. 25, 2018, the disclosure of which is hereby incorporated by reference herein in its entirety.

BACKGROUND

1. Technical Field

The present disclosure relates to a plasticizing device and a three-dimensional shaping device.

2. Related Art

For example, JP-A-2010-241016 discloses a plasticizing device which has a rotor having a helical groove formed at an end surface, and a barrel facing the end surface of the rotor where the helical groove is formed and having a communication hole at the center. In this plasticizing device, a material is supplied into the helical groove of the rotor from a hopper at a timing when a material outlet port of the hopper and a material inlet port provided at a lateral side of the rotating rotor overlap each other.

In the above plasticizing device, the material is supplied into the helical groove of the rotor from the hopper according to the rotation cycle of the rotor. Therefore, during the period from a timing when the material is supplied into the spiral groove of the rotor from the hopper to the next timing when the material is supplied, the material melted in the spiral groove flows out from the communication hole of the barrel and the amount of the material in the spiral groove decreases. Thus, the applicant of the present disclosure has found that the pressure of the molten material pressure-fed into the communication hole changes, causing a change in the flow rate of the molten material ejected from the communication hole.

SUMMARY

The present disclosure proposes a plasticizing device in which the change in the flow rate of the molten material ejected from the communication hole is small.

According to an aspect of the present disclosure, a plasticizing device plasticizing a material into a molten material is provided. The plasticizing device includes: a drive motor; a rotating unit driven to rotate about a rotation axis by the drive motor and having an end surface perpendicular to the rotation axis and a lateral surface intersecting with the end surface; a barrel having a bottom surface facing the end surface of the rotating unit, and a heater; a case accommodating the rotating unit; and a material supply unit accommodating the material. At least one of the barrel and the case has a sidewall surface facing the lateral surface of the rotating unit and standing up along an outer circumference of the bottom surface of the barrel. At the bottom surface of the barrel, a communication hole through which the molten material flows out and a spiral groove part coupled to the communication hole are formed. The lateral surface of the rotating unit and the sidewall surface together define a supply space where the material is supplied from the material supply unit to the groove part.

DESCRIPTION OF EXEMPLARY EMBODIMENTS

A. First Embodiment

Figure 1:
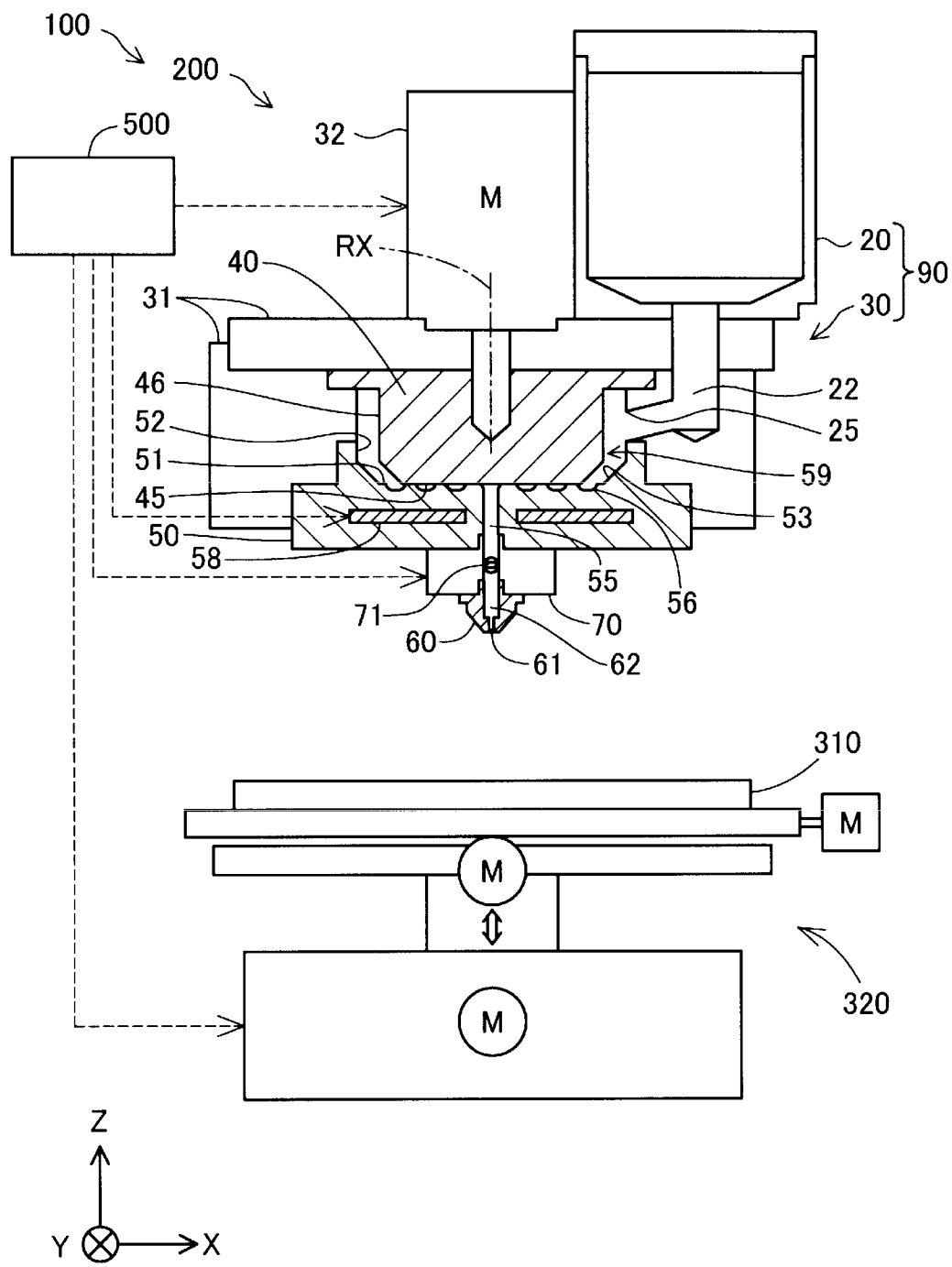
FIG. 1 is an explanatory view showing a schematic configuration of a three-dimensional shaping device in a first embodiment.

FIG. 1 is an explanatory view showing a schematic configuration of a three-dimensional shaping device 100 in a first embodiment. In FIG. 1, arrows along X, Y, and Z-axes orthogonal to each other are shown. The X-axis and the Y-axis are along the horizontal direction. The Z-axis is along the vertical direction. Similarly, arrows along the X, Y, and Z-axes are shown in the other drawings, according to need. The X, Y, and Z-axes in FIG. 1 represent the same axes as the X, Y, and Z-axes in the other drawings.

The three-dimensional shaping device 100 has: an ejection unit 200 including a nozzle unit 60, a flow rate adjustment mechanism 70, and a plasticizing device 90; a shaping table 310; a movement mechanism 320; and a control unit 500. In the three-dimensional shaping device 100 in this embodiment, under the control of the control unit 500, a shaping material plasticized by the plasticizing device 90 is supplied to the nozzle unit 60, and the shaping material ejected from a nozzle hole 61 of the nozzle unit 60 is stacked at the top of the shaping table 310, thus shaping a three-dimensional shaped object. The shaping material may be referred to as a molten material.

The movement mechanism 320 changes the relative position between the shaping table 310 and the ejection unit 200. In this embodiment, the movement mechanism 320 moves the shaping table 310 relative to the ejection unit 200. The movement mechanism 320 in this embodiment is formed of a three-axis positioner which moves the shaping table 310 along the three axes of X, Y, and Z by drive forces of three motors. Each motor drives under the control of the control unit 500.

Instead of being configured to move the shaping table 310, the movement mechanism 320 may be configured to move the ejection unit 200 without moving the shaping table 310. The movement mechanism 320 may also be configured to move both the shaping table 310 and the ejection unit 200. The movement mechanism 320 may have any configuration that can change the relative position between the shaping table 310 and the ejection unit 200.

The control unit 500 is formed of a computer having one or more processors, a main storage device, and an input/output interface to input a signal from outside and output a signal to outside. In this embodiment, the control unit 500 causes the processor to execute a program or command read into the main storage device and thereby controls an operation of the ejection unit 200 and the movement mechanism 320, thus executing shaping processing to shape a three-dimensional shaped object. The operation includes a movement of the three-dimensional relative position of the ejection unit 200 relative to the shaping table 310. The control unit 500 may also be configured of a combination of a plurality of circuits, instead of a computer.

The plasticizing device 90 has a material supply unit 20 and a plasticizing unit 30. The material supply unit 20 and the plasticizing unit 30 communicate with each other via a supply path 22. The plasticizing unit 30 and the nozzle hole 61 of the nozzle unit 60 communicate with each other via a communication hole 55. The plasticizing device 90 at least partly melts a solid-state material and supplies the resulting paste-like shaping material to the nozzle unit 60.

The material supply unit 20 accommodates a material in the state of pellets, powder or the like. The material in this embodiment is ABS resin in the form of pellets. The material supply unit 20 in this embodiment is formed of a hopper. The material accommodated in the material supply unit 20 is supplied to the plasticizing unit 30 via the supply path 22 provided below the material supply unit 20.

The plasticizing unit 30 has a screw case 31, a drive motor 32, a flat screw 40, and a barrel 50. The screw case 31 is a casing accommodating the flat screw 40. The drive motor 32 is fixed to a top surface of the screw case 31. The drive motor 32 drives under the control of the control unit 500 and thus rotates the flat screw 40 about a rotation axis RX. The flat screw 40 may be referred to as a rotating unit. The screw case 31 may be simply referred to as a case.

In this embodiment, the flat screw 40 is arranged in the screw case 31 in such a way that the rotation axis RX is parallel to the Z-axis. The drive motor 32 is coupled to a top surface of flat screw 40. A torque generated by the drive motor 32 causes the flat screw 40 to rotate about the rotation axis RX in the screw case 31. The flat screw 40 has an end surface 45 perpendicular to the rotation axis RX, at the side opposite to the surface where the drive motor 32 is coupled. The flat screw 40 has a lateral surface 46 intersecting with the end surface 45. The detailed shape of the flat screw 40 will be described later with reference to FIG. 2.

In this embodiment, the barrel 50 is fixed to the bottom side of the screw case 31. The barrel 50 has a bottom surface 51 facing the end surface 45 of the flat screw 40. In the bottom surface 51, the communication hole 55 is provided at a position on the rotation axis RX of the flat screw 40. A spiral groove part 56 is provided around the communication hole 55 in the bottom surface 51. The barrel 50 has a built-in heater 58. The temperature of the heater 58 is controlled by the control unit 500. The detailed shape of the barrel 50 will be described later with reference to FIG. 3.

In this embodiment, the barrel 50 and the screw case 31 together form a sidewall surface 52 facing the lateral surface 46 of the flat screw 40 and standing up along the outer circumference of the bottom surface 51. In this embodiment, an upper-side part of the sidewall surface 52 is formed by an inner wall surface of the screw case 31. A supply port 25 communicating with the material supply unit 20 is provided at the inner wall surface of the screw case 31. A lower-side part of the sidewall surface 52 is formed by a wall surface standing up from the bottom surface 51 of the barrel 50. Also, the sidewall surface 52 may be formed by the screw case 31 alone, where the inner wall surface of the screw case 31 extends to the bottom surface 51 of the barrel 50. The sidewall surface 52 may also be formed by the barrel 50 alone, where the wall surface standing up from the bottom surface of the barrel 50 extends to above the top surface of the flat screw 40.

In this embodiment, the wall surface of the barrel 50 forming the sidewall surface 52 has a slope part 53 at a position intersecting with the bottom surface 51. The slope part 53 is sloped in such a way as to approach the center of the bottom surface 51 as it goes toward the bottom surface 51.

The lateral surface 46 of the flat screw 40 and the sidewall surface 52 together define a supply space 59 where the material is supplied from the material supply unit 20 to the groove part 56. The supply space 59 is a space where the material can circulate from the supply port 25 into the groove part 56.

The flow rate adjustment mechanism 70 is provided with a valve mechanism 71. The valve mechanism 71 in this embodiment is formed of a butterfly valve. The valve mechanism 71 opens and closes under the control of the control unit 500 and switches between communication and non-communication between the communication hole 55 and the nozzle hole 61.

Inside the nozzle unit 60, a nozzle flow path 62 and the nozzle hole 61 are provided. The nozzle hole 61 is a part that is provided at an end part at the side communicating with the atmosphere and that has a reduced flow path cross section, in the nozzle unit 60. The nozzle flow path 62 is supplied with the shaping material from the plasticizing device 90 via the flow rate adjustment mechanism 70. The shaping material supplied to the nozzle flow path 62 is ejected from the nozzle hole 61. In this embodiment, the diameter of the nozzle flow path 62 is the same as the diameter of the communication hole 55. However, the diameter of the nozzle flow path 62 may be smaller than the diameter of the communication hole 55. A nozzle diameter Dn of the nozzle hole 61 is smaller than the diameter of the nozzle flow path 62. The nozzle diameter Dn is the diameter of the nozzle hole 61 at the end part at the side communicating with the atmosphere.

Figure 2:
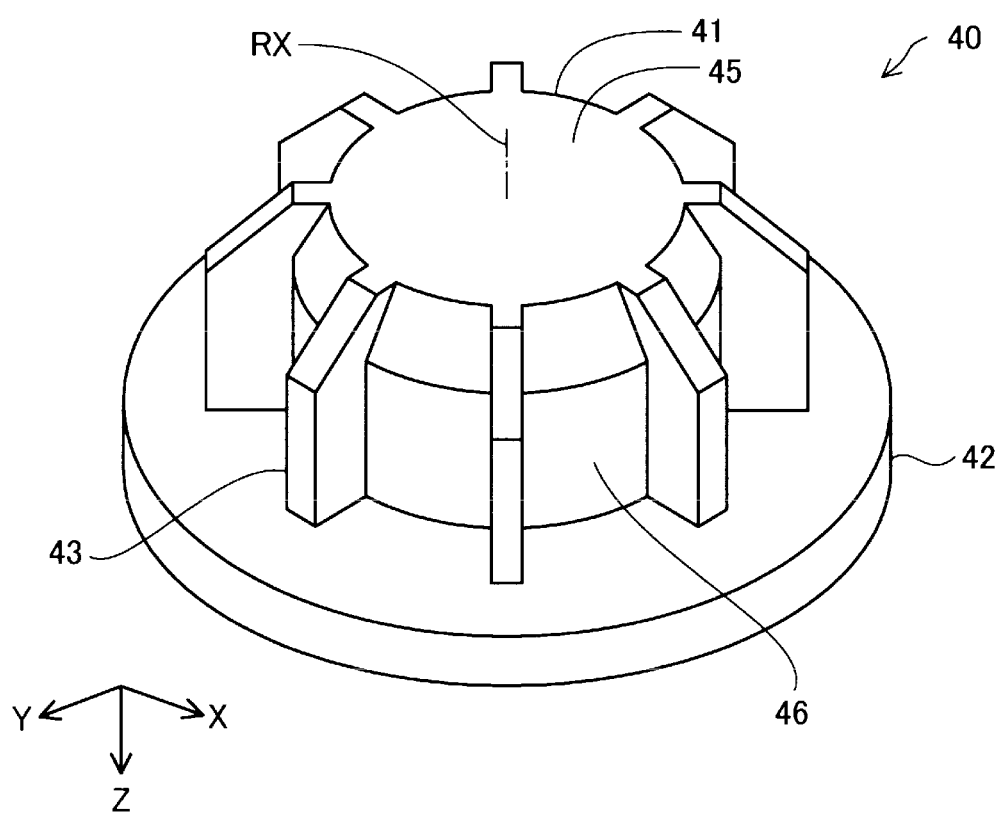
FIG. 2 is a perspective view showing a configuration of a flat screw in the first embodiment.

FIG. 2 is a perspective view showing the configuration of the flat screw 40 in the first embodiment. The flat screw 40 shown in FIG. 2 is in the state where the up-down positional relation shown in FIG. 1 is reversed in order to facilitate understanding of the technology. The flat screw 40 in this embodiment has a main body part 41, a flange part 42, and a plurality of blade parts 43. In the flat screw 40 in this embodiment, the main body part 41, the flange part 42, and the plurality of blade parts 43 are molded as one body.

The main body part 41 is substantially cylindrical. The main body part 41 has the foregoing end surface 45. The diameter of the main body part 41 near the end surface 45 becomes smaller as it goes toward the end surface 45.

The flange part 42 is a disk-like part provided at the side opposite to the end surface 45 in the axial direction of the main body part 41. The radius of the flange part 42 is larger than the radius of the main body part 41.

The blade part 43 is a part protruding in a radial direction of the main body part 41 from the lateral surface 46 of the main body part 41. The blade part 43 is provided between the end surface 45 and the flange part 42 in the axial direction of the main body part 41. The blade part 43 is coupled to the lateral surface 46 of the main body part 41 and to the flange part 42. A part at the side of the end surface 45, of the blade part 43, is sloped so as not to interfere with the slope part 53 of the barrel 50. In this embodiment, eight blade parts 43 are arranged at equal intervals in the circumferential direction of the main body part 41.

Figure 3:
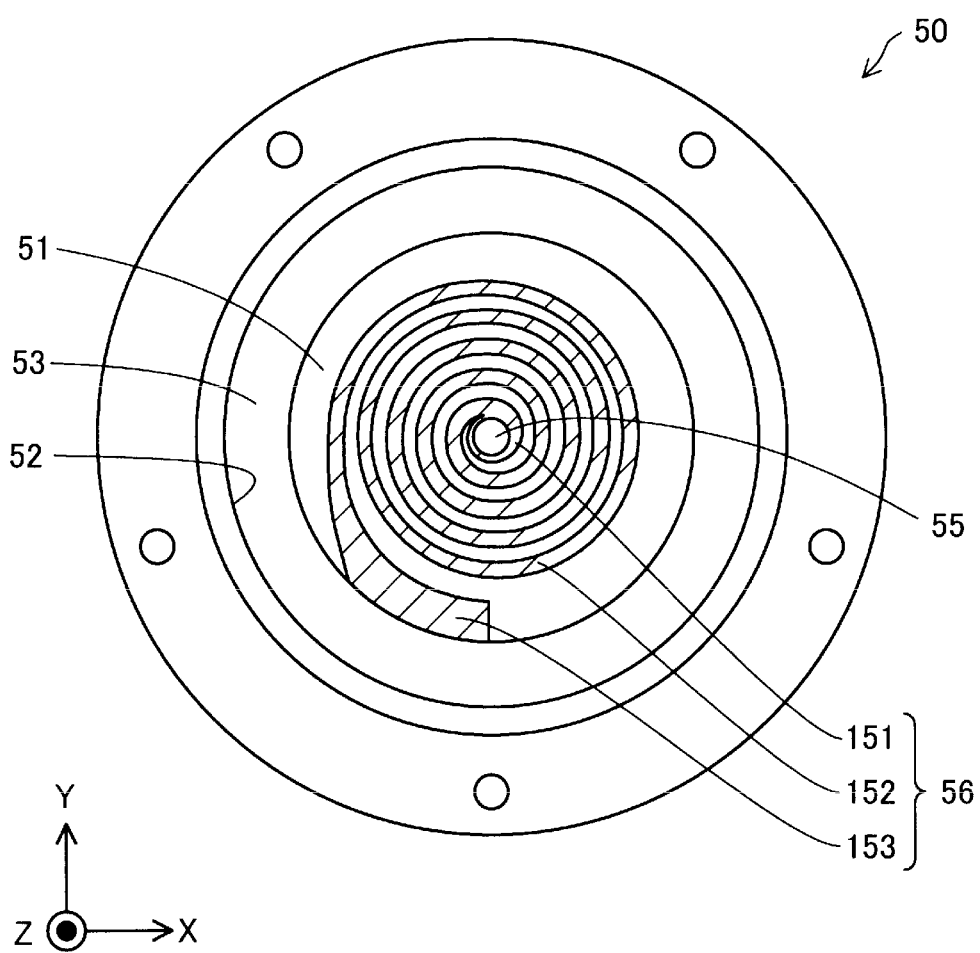
FIG. 3 is a top view showing a configuration of a bottom surface of a barrel in the first embodiment.

FIG. 3 is a top view showing the configuration of the bottom surface 51 of the barrel 50 in the first embodiment. As described above, the communication hole 55 and the spiral groove part 56 are formed at the bottom surface 51 of the barrel 50. In FIG. 3, the groove part 56 is hatched in order to facilitate understanding of the technology.

The communication hole 55 is provided at the center of the bottom surface 51. The groove part 56 has a center part 151, a spiral part 152, and a material inflow part 153. The center part 151 is a circular depression around the communication hole 55. One end of the spiral part 152 is coupled to the communication hole 55 via the center part 151. The spiral part 152 spirally extends about the center part 151 in such a way as to form an arc toward the outer circumference of the bottom surface 51. The spiral part 152 may be formed in such a way as to extend in the shape of an involute curve or helically.

In this embodiment, the cross section of the spiral part 152 perpendicular to the direction of a tangent to the spiral is rectangular. The cross-sectional area of the spiral part 152 in this embodiment is constant. In this embodiment, since the cross section of the spiral part 152 is rectangular, the cross-sectional area of the spiral part 152 can be calculated as the product of the width and depth of the groove of the spiral part 152. Also, the cross section of the spiral part 152 may be other than rectangular. For example, the cross section of the spiral part 152 may be semicircular. In this case, the cross-sectional area of the spiral part 152 can be calculated using pi (the ratio of the circumference of the circle to its diameter) and the radius of the groove of the spiral part 152.

The other end of the spiral part 152 is coupled to the material inflow part 153. The material inflow part 153 is a groove-like part provided at the outer circumferential edge of the bottom surface 51 and wider than the spiral part 152. The supply port 25 of the supply path 22 is arranged above the material inflow part 153.

In the above configuration of the three-dimensional shaping device 100, as the control unit 500 executes shaping processing to shape a three-dimensional shaped object, the material in the material supply unit 20 travels through the supply port 25 and is supplied into the supply space 59 between the lateral surface 46 of the rotating flat screw 40 and the sidewall surface 52 formed by the screw case 31 and the barrel 50.

In this embodiment, the blade part 43 of the rotating flat screw 40 circles inside the supply space 59. Therefore, the material supplied from the supply port 25 sequentially fills the space between the respective blade parts 43 of the rotating flat screw 40. A part of the material filling the space between the blade parts 43 is supplied into the material inflow part 153 at a timing when this space overlaps the material inflow part 153. In the space between the blade parts 43 where the amount of the material filling the space is reduced as the material is supplied into the material inflow part 153, the material is additionally supplied from the supply port 25 at a timing when this space overlaps the supply port 25. Therefore, the inside of the supply space 59 is filled with the material while the flat screw 40 is rotating.

The material supplied into the material inflow part 153 is transported into the spiral part 152 by the rotation of the flat screw 40. The material transported into the spiral part 152 is at least partly melted by the rotation of the flat screw 40 and the heating by the heater 58 built inside the barrel 50, and thus becomes a fluid paste-like shaping material. The shaping material is transported within the spiral part 152 and pressure-fed into the communication hole 55 by the rotation of the flat screw 40. The shaping material supplied to the nozzle unit 60 via the communication hole 55 is ejected from the nozzle hole 61 toward the top of the shaping table 310.

In the three-dimensional shaping device 100 in this embodiment described above, the material supplied from the material supply unit 20 is stored in the supply space 59 provided between the flat screw 40 and the barrel 50. This enables continuous supply of the material from the supply space 59 to the groove part 56. Therefore, a change in the pressure of the shaping material pressure-fed into the communication hole 55 can be restrained and a change in the flow rate of the shaping material ejected from the communication hole 55 can be restrained. Thus, a change in the flow rate of the shaping material ejected from the nozzle hole 61 can be restrained.

Also, in this embodiment, the blade part 43 protruding in the radial direction of the rotating flat screw 40 can stir the material inside the supply space 59. Therefore, the material can be restrained from adhering to the barrel 50 and closing the supply space 59.

Also, in this embodiment, the material supplied from the supply port 25 provided above the slope part 53 flows along the slope part 53 and smoothly flows into the material inflow part 153. This facilitates the supply of the material into the material inflow part 153.

In this embodiment, ABS resin pellets are used as the material. However, as the material used in the ejection unit 200, a material shaping a three-dimensional shaped object which contains various materials such as thermoplastic material, metal material, and ceramic material, as its main material, can be employed. Here, the "main material" means a material mainly contributing to the shaping of the three-dimensional shaped object and means a material whose content in the three-dimensional shaped object is 50% by weight or higher. The shaping material includes the main material melted as a single material, or a paste-like material in which a part of a component contained along with the main material is melted.

When a thermoplastic material is used as the main material, the plasticizing device 90 plasticizes the material and thus produces the shaping material. The term "plasticize" means to melt the thermoplastic material by applying heat.

As the thermoplastic material, for example, one or a combination of two or more of the following thermoplastic materials can be used.

Examples of Thermoplastic Material:

Versatile engineering plastics such as polypropylene resin (PP), polyethylene resin (PE), polyacetal resin (POM), polyvinyl chloride resin (PVC), polyamide resin (PA), acrylonitrile butadiene styrene resin (ABS), polylactide resin (PLA), polyphenylene sulfide resin (PPS), polyether ether ketone (PEEK), polycarbonate (PC), modified polyphenylene ether, polybutylene terephthalate, and polyethylene terephthalate, and engineering plastics such as polysulfone, polyethersulfone, polyphenylene sulfide, polyacrylate, polyimide, polyamide imide, polyether imide, and polyether ether ketone An additive such as a pigment, metal, ceramic, wax, flame retardant, antioxidant, or thermal stabilizer may be mixed into the thermoplastic material. In the plasticizing device 90, the thermoplastic material is plasticized by the rotation of the flat screw 40 and the heating by the heater 58 and thus transformed into a molten state. The shaping material thus produced hardens due to a temperature drop after being ejected from the nozzle hole 61.

It is desirable that the thermoplastic material is heated to its glass transition temperature or more and is ejected in a completely molten state from the nozzle hole 61. For example, it is desirable that the ABS resin, which has a glass transition temperature of approximately 120° C., is at approximately 200° C. when ejected from the nozzle hole 61. In order to eject the shaping material in such a high-temperature state, a heater may be provided around the nozzle hole 61.

In the ejection unit 200, for example, the following metal material may be used as the main material, instead of the above thermoplastic material. In this case, it is desirable that a component which melts when producing the shaping material is mixed with a powder material formed of the following metal material in a powder state and that the mixture is put into the plasticizing device 90.

Examples of Metal Material:

A single metal of magnesium (Mg), iron (Fe), cobalt (Co), chromium (Cr), aluminum (Al), titanium (Ti), copper (Cu), or nickel (Ni), or an alloy containing one or more of these metals Examples of Alloy:

Maraging steel, stainless steel, cobalt-chromium-molybdenum, titanium alloy, nickel alloy, aluminum alloy, cobalt alloy, and cobalt-chromium alloy In the ejection unit 200, a ceramic material can be used as the main material, instead of the above metal material. As the ceramic material, for example, an oxide ceramic such as silicon dioxide, titanium dioxide, aluminum oxide or zirconium oxide, or a non-oxide ceramic such as aluminum nitride can be used. When a metal material or ceramic material as described is used as the main material, the shaping material arranged at the shaping table 310 may be hardened, for example, by sintering with laser irradiation, hot air, or the like.

The powder material of the metal material or the ceramic material put into the material supply unit 20 may be a mixture material made up of a plurality of types of powder of a single metal, powder of an alloy, or powder of a ceramic material mixed together. The powder material of the metal material or the ceramic material may be coated, for example, with a thermoplastic resin as described above or other thermoplastic resins. In this case, the thermoplastic material may be melted and thus manifest its fluidity in the plasticizing device 90.

To the powder material of the metal material or the ceramic material put into the material supply unit 20, for example, the following solvent can be added. As the solvent, one type or a combination of two or more types selected from below can be used.

Examples of Solvent:

Water; (poly) alkylene glycol monoalkyl ethers such as ethylene glycol monomethyl ether, ethylene glycol monoethyl ether, propylene glycol monomethyl ether, and propylene glycol monoethyl ether; acetic esters such as ethyl acetate, n-propyl acetate, isopropyl acetate, n-butyl acetate, and isobutyl acetate; aromatic hydrocarbons such as benzene, toluene, and xylene; ketones such as methyl ethyl ketone, acetone, methyl isobutyl ketone, ethyl n-butyl ketone, diisopropyl ketone, and acetyl acetone; alcohols such as ethanol, propanol, and butanol; tetraalkylammonium acetates; sulfoxide-based solvents such as dimethyl sulfoxide and diethyl sulfoxide; pyridine-based solvents such as pyridine, γ-picoline, and 2,6-lutidine; tetraalkylammonium acetate (for example, tetrabutylammonium acetate or the like); and ionic liquid such as butyl carbitol acetate, or the like.

Moreover, for example, the following binder can be added to the powder material of the metal material or the ceramic material put into the material supply unit 20.

Examples of Binder:

Acrylic resin, epoxy resin, silicone resin, cellulose-based resin or other synthetic resins or PLA (polylactic acid), PA (polyamide), PPS (polyphenylene sulfide), PEEK (polyether ether ketone), or other thermoplastic resins

B. Second Embodiment

Figure 4:
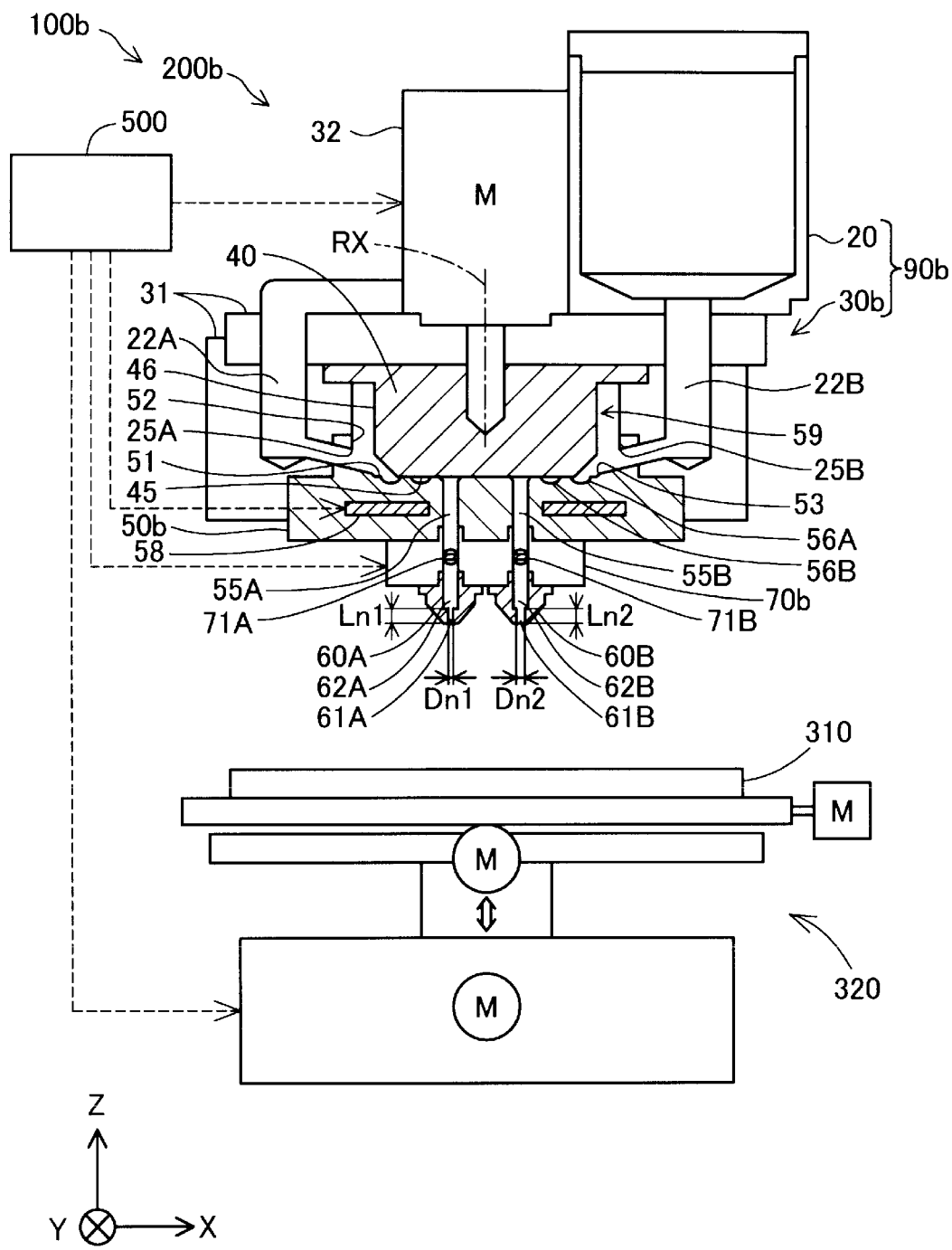
FIG. 4 is an explanatory view showing a schematic configuration of a three-dimensional shaping device in a second embodiment.

FIG. 4 is an explanatory view showing a schematic configuration of a three-dimensional shaping device 100b in a second embodiment. The three-dimensional shaping device 100b in the second embodiment is different from the first embodiment in that an ejection unit 200b has a first nozzle unit 60A and a second nozzle unit 60B. Also, in the three-dimensional shaping device 100b in the second embodiment, the configuration of a plasticizing unit 30b of a plasticizing device 90b is different from that in the first embodiment. The other configurations are the same as in the first embodiment shown in FIG. 1 unless stated otherwise.

In the first nozzle unit 60A, a first nozzle flow path 62A and a first nozzle hole 61A are provided. The first nozzle hole 61A is a part that is provided at an end part at the side communicating with the atmosphere and that has a reduced flow path cross section, in the first nozzle unit 60A. The first nozzle flow path 62A is supplied with the shaping material from the plasticizing device 90b via a flow rate adjustment mechanism 70b. The shaping material supplied to the first nozzle flow path 62A is ejected from the first nozzle hole 61A. In this embodiment, the diameter of the first nozzle flow path 62A is the same as the diameter of a first communication hole 55A. However, the diameter of the first nozzle flow path 62A may be smaller than the diameter of the first communication hole 55A. A nozzle diameter Dn1 of the first nozzle hole 61A is smaller than the diameter of the first nozzle flow path 62A.

In the second nozzle unit 60B, a second nozzle flow path 62B and a second nozzle hole 61B are provided. The second nozzle hole 61B is a part that is provided at an end part at the side communicating with the atmosphere and that has a reduced flow path cross section, in the second nozzle unit 60B. The second nozzle flow path 62B is supplied with the shaping material from the plasticizing device 90b via the flow rate adjustment mechanism 70b. The shaping material supplied to the second nozzle flow path 62B is ejected from the second nozzle hole 61B. In this embodiment, the diameter of the second nozzle flow path 62B is the same as the diameter of a second communication hole 55B. However, the diameter of the second nozzle flow path 62B may be smaller than the diameter of the second communication hole 55B. A nozzle diameter Dn2 of the second nozzle hole 61B is smaller than the diameter of the second nozzle flow path 62B.

In this embodiment, the nozzle diameter Dn1 of the first nozzle hole 61A is smaller than the nozzle diameter Dn2 of the second nozzle hole 61B. A nozzle length Ln1 of the first nozzle hole 61A is the same as a nozzle length Ln2 of the second nozzle hole 61B. The nozzle lengths Ln1, Ln2 are the flow path length from the end part at the side of the plasticizing device 90b to the end part at the side communicating with the atmosphere, in the nozzle holes 61A, 61B.

In this embodiment, the first communication hole 55A, the second communication hole 55B, a spiral first groove part 56A coupled to the first communication hole 55A, and a spiral second groove part 56B coupled to the second communication hole 55B are formed at the bottom surface 51 of a barrel 50b in the plasticizing unit 30b. The first communication hole 55A communicates with the first nozzle hole 61A. The second communication hole 55B communicates with the second nozzle hole 61B. The detailed shape of the barrel 50b in this embodiment will be described later with reference to FIG. 5.

In the flow rate adjustment mechanism 70b, a first valve mechanism 71A and a second valve mechanism 71B are provided. Each of the first valve mechanism 71A and the second valve mechanism 71B in this embodiment is formed of a butterfly valve. The first valve mechanism 71A opens and closes under the control of the control unit 500 and switches between communication and non-communication between the first communication hole 55A and the first nozzle hole 61A. The second valve mechanism 71B opens and closes under the control of the control unit 500 and switches between communication and non-communication between the second communication hole 55B and the second nozzle hole 61B.

Figure 5:
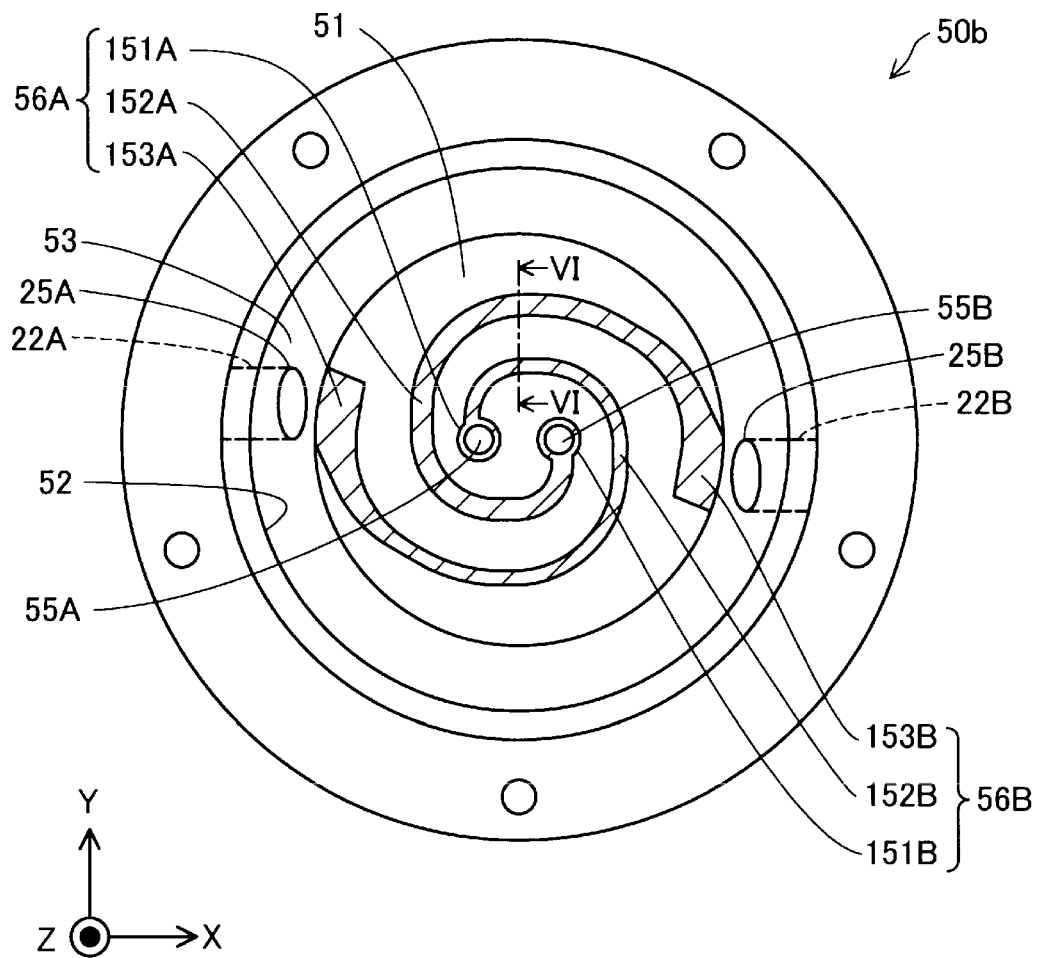
FIG. 5 is a top view showing a configuration of a bottom surface of a barrel in the second embodiment.

FIG. 5 is a top view showing the configuration of the bottom surface 51 of the barrel 50b in the second embodiment. In this embodiment, the first communication hole 55A, the second communication hole 55B, the first groove part 56A coupled to the first communication hole 55A, and the second groove part 56B coupled to the second communication hole 55B are provided, as described above. In FIG. 5, the first groove part 56A and the second groove part 56B are hatched in order to facilitate understanding of the technology.

The first groove part 56A has a first center part 151A, a first spiral part 152A, and a first material inflow part 153A. The first center part 151A is a circular depression around the first communication hole 55A. One end of the first spiral part 152A is coupled to the first communication hole 55A via the first center part 151A. The first spiral part 152A spirally extends about the first center part 151A in such a way as to form an arc toward the outer circumference of the bottom surface 51. The other end of the first spiral part 152A is coupled to the first material inflow part 153A. The first material inflow part 153A is a groove-like part provided at the outer circumferential edge of the bottom surface 51 and wider than the first spiral part 152A. In this embodiment, a first supply port 25A is arranged at the slope part 53 above the first material inflow part 153A. The material supply unit 20 and the first supply port 25A are coupled together via a first supply path 22A.

The second groove part 56B has a second center part 151B, a second spiral part 152B, and a second material inflow part 153B. The second center part 151B is a circular depression around the second communication hole 55B. One end of the second spiral part 152B is coupled to the second communication hole 55B via the second center part 151B. The second spiral part 152B spirally extends about the second center part 151B in such a way as to form an arc toward the outer circumference of the bottom surface 51. In this embodiment, the length along the spiral of the first spiral part 152A and the length along the spiral of the second spiral part 152B are the same. The second material inflow part 153B is a groove-like part provided at the outer circumferential edge of the bottom surface 51 and wider than the second spiral part 152B. In this embodiment, a second supply port 25B is arranged at the slope part 53 above the second material inflow part 153B. The material supply unit 20 and the second supply port 25B are coupled together via a second supply path 22B.

Figure 6:
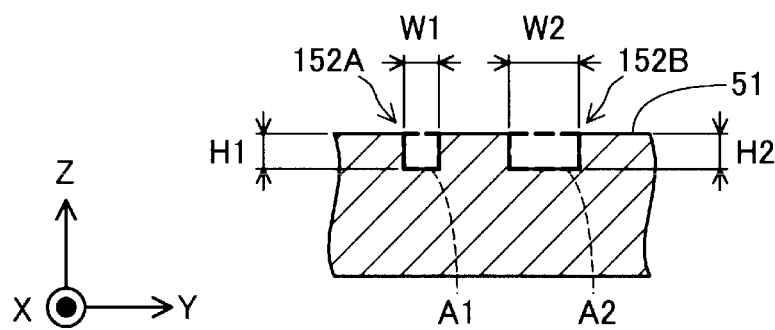
FIG. 6 is a cross-sectional view taken along VI-VI of the barrel in the second embodiment.

FIG. 6 is a cross-sectional view taken along VI-VI of the barrel 50b shown in FIG. 5. In this embodiment, the shape of the first spiral part 152A and the shape of the second spiral part 152B are different from each other. Specifically, a width W1 of the first spiral part 152A is narrower than the width W2 of the second spiral part 152B. A depth H1 of the first spiral part 152A is the same as a depth H2 of the second spiral part 152B. Therefore, a cross-sectional area A1 of the first spiral part 152A is smaller than a cross-sectional area A2 of the second spiral part 152B. In this embodiment, the cross-sectional area A1 of the first spiral part 152A is constant and the cross-sectional area A2 of the second spiral part 152B is constant.

In the configuration of the three-dimensional shaping device 100b described above, as the control unit 500 executes shaping processing to shape a three-dimensional shaped object, the material in the material supply unit 20 travels through the first supply path 22A and is supplied from the first supply port 25A into the supply space 59 between the lateral surface 46 of the rotating flat screw 40 and the sidewall surface 52. The material in the material supply unit 20 also travels through the second supply path 22B and is supplied from the second supply port 25B into the supply space 59 between the lateral surface 46 of the rotating flat screw 40 and the sidewall surface 52.

In this embodiment, a part of the material supplied into the supply space 59 from the first supply port 25A travels between the blade parts 43 of the flat screw 40 and flows into the first material inflow part 153A provided below the first supply port 25A. The material not flowing into the first material inflow part 153A and remaining in the supply space 59 is transported to the second material inflow part 153B by the blade parts 43 of the rotating flat screw 40 and flows into the second material inflow part 153B. The material not flowing into the second material inflow part 153B and remaining in the supply space 59 is transported again to the first material inflow part 153A by the blade parts 43 of the rotating flat screw 40 and flows into the first material inflow part 153A.

A part of the material supplied into the supply space 59 from the second supply port 25B travels between the blade parts 43 of the flat screw 40 and flows into the second material inflow part 153B provided below the second supply port 25B. The material not flowing into the second material inflow part 153B and remaining in the supply space 59 is transported to the first material inflow part 153A by the blade parts 43 of the rotating flat screw 40 and flows into the first material inflow part 153A. The material not flowing into the first material inflow part 153A and remaining in the supply space 59 is transported again to the second material inflow part 153B by the blade parts 43 of the rotating flat screw 40 and flows into the second material inflow part 153B.

The material flowing into the first material inflow part 153A is transported into the first spiral part 152A by the rotation of the flat screw 40. The material transported into the first spiral part 152A is at least partly melted by the rotation of the flat screw 40 and the heating by the heater 58 built inside the barrel 50b, and thus becomes a fluid paste-like shaping material. The shaping material is transported within the first spiral part 152A and pressure-fed into the first communication hole 55A by the rotation of the flat screw 40.

The material flowing into the second material inflow part 153B is transported into the second spiral part 152B by the rotation of the flat screw 40. The material transported into the second spiral part 152B is at least partly melted by the rotation of the flat screw 40 and the heating by the heater 58 built inside the barrel 50b, and thus becomes a fluid paste-like shaping material. The shaping material is transported within the second spiral part 152B and pressure-fed into the second communication hole 55B by the rotation of the flat screw 40.

In this embodiment, to shape the outer shape of the three-dimensional shaped object that needs a higher dimensional accuracy than the inner shape, the control unit 500 causes the second valve mechanism 71B to close and the first valve mechanism 71A to open and thus causes the shaping material to be ejected from the first nozzle hole 61A with the smaller diameter toward the top of the shaping table 310, thereby shaping the three-dimensional shaped object. The outer shape refers to a site visible from outside, of the three-dimensional shaped object. The inner shape refers to a site of the three-dimensional shaped object other than the outer shape. Meanwhile, to shape the inner shape of the three-dimensional shaped object, the control unit 500 causes the first valve mechanism 71A to close and the second valve mechanism 71B to open and thus causes the shaping material to be ejected from the second nozzle hole 61B with the larger diameter toward the top of the shaping table 310, thereby shaping the three-dimensional shaped object.

In the three-dimensional shaping device 100b in this embodiment described above, the material is plasticized by the pair of the flat screw 40 and the barrel 50b and the shaping material can be ejected from the first communication hole 55A and the second communication hole 55B. Therefore, the shaping material can be supplied to the first nozzle unit 60A and the second nozzle unit 60B without complicating the configuration of the three-dimensional shaping device 100b having the plasticizing device 90b incorporated therein.

Also, in this embodiment, the first groove part 56A formed in the barrel 50b has the first spiral part 152A, and the second groove part 56B has the second spiral part 152B. Therefore, the material can be melted in the first groove part 56A and transported toward the first communication hole 55A more easily by the rotation of the flat screw 40. Also, the material can be melted in the second groove part 56B and transported toward the second communication hole 55B more easily by the rotation of the flat screw 40.

Also, in this embodiment, since the shape of the first spiral part 152A and the shape of the second spiral part 152B are different from each other, the shaping material can be ejected from the first communication hole 55A and the second communication hole 55B at different flow rates and with different pressures. Particularly, in this embodiment, the cross-sectional area A1 of the first spiral part 152A communicating with the first communication hole 55A is smaller than the cross-sectional area A2 of the second spiral part 152B communicating with the second communication hole 55B. Therefore, the pressure of the shaping material pressure-fed into the first communication hole 55A communicating with the first nozzle hole 61A with the smaller diameter can be made higher than the pressure of the shaping material pressure-fed into the second communication hole 55B communicating with the second nozzle hole 61B with the larger diameter. Thus, a drop in the amount of the shaping material ejected from the first nozzle hole 61A having a higher resistance than the second nozzle hole 61B can be restrained.

Also, in this embodiment, the blade part 43 can stir the material in the flat screw 40 and the barrel 50b. This enables the material to flow easily into the first material inflow part 153A and the second material inflow part 153B.

Also, in this embodiment, the nozzle diameter Dn1 of the first nozzle hole 61A is smaller than the nozzle diameter Dn2 of the second nozzle hole 61B. Therefore, the outer shape, which needs higher quality in terms of dimensional accuracy and surface roughness than the inner shape of the three-dimensional shaped object, can be finely shaped by ejecting the shaping material from the first nozzle hole 61A with the smaller diameter. Also, the inner shape of the three-dimensional shaped object can be shaped in a short time by ejecting the shaping material from the second nozzle hole 61B with the larger diameter.

Also, in this embodiment, the first valve mechanism 71A can switch on and off the ejection of the shaping material from the first nozzle hole 61A, and the second valve mechanism 71B can switch on and off the ejection of the shaping material from the second nozzle hole 61B. Therefore, when the shaping material is ejected from the first nozzle hole 61A to shape a three-dimensional shaped object, the shaping material can be restrained from leaking from the second nozzle hole 61B. When the shaping material is ejected from the second nozzle hole 61B to shape a three-dimensional shaped object, the shaping material can be restrained from leaking from the first nozzle hole 61A.

Also, in this embodiment, the first supply port 25A is arranged at the slope part 53 above the first material inflow part 153A, and the second supply port 25B is arranged at the slope part 53 above the second material inflow part 153B. This enables the material to be supplied into the supply space 59 from a position near each material inflow part 153A, 153B and therefore enables the material to flow into each material inflow part 153A, 153B more easily.

C. Third Embodiment

Figure 7:
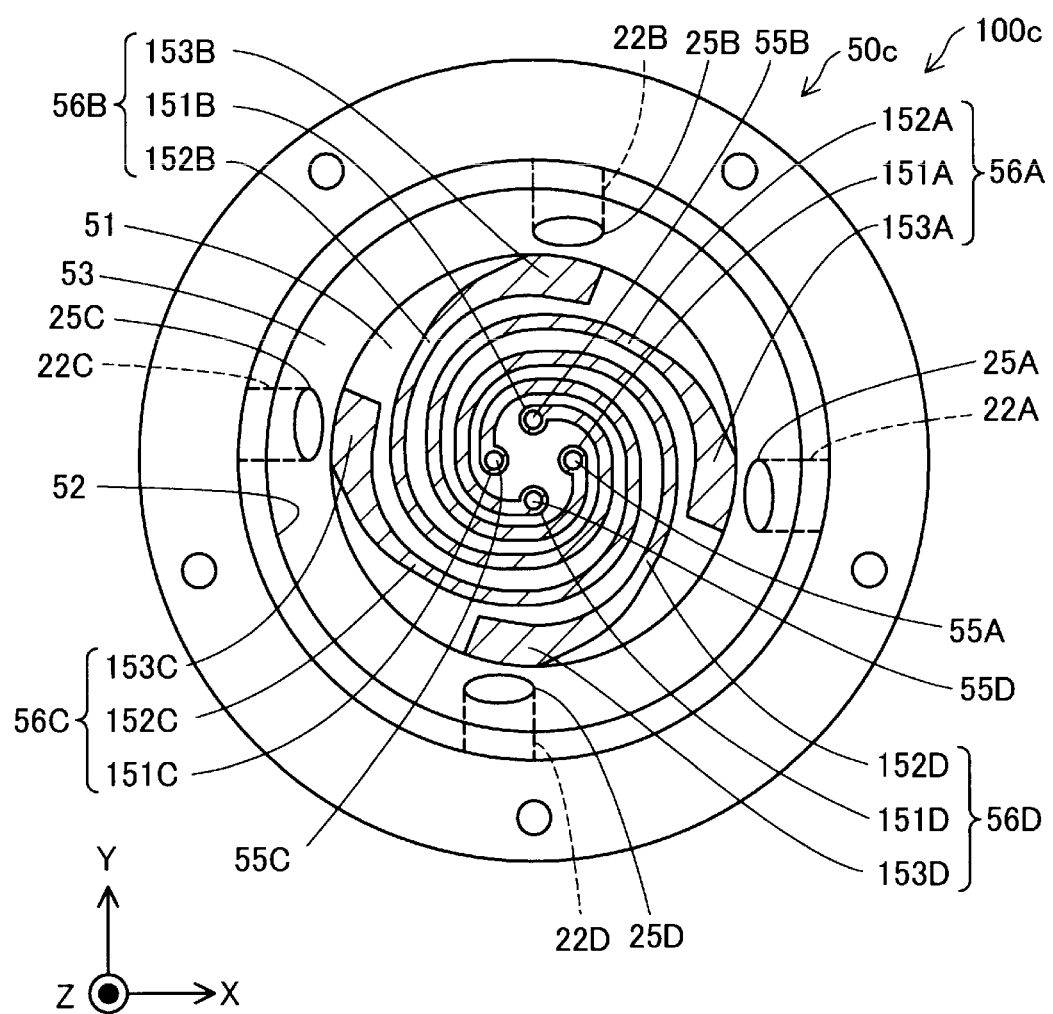
FIG. 7 is a top view showing a configuration of a bottom surface of a barrel in a third embodiment.

FIG. 7 is a top view showing the configuration of the bottom surface 51 of a barrel 50c in a third embodiment. In a three-dimensional shaping device 100c in the third embodiment, the configuration of the barrel 50c in an ejection unit 200c is different from that in the second embodiment. Specifically, a first communication hole 55A, a second communication hole 55B, a third communication hole 55C, and a fourth communication hole 55D communicating respectively with separate nozzle holes 61 are formed at the bottom surface 51 of the barrel 50c. Also, a first groove part 56A coupled to the first communication hole 55A, a second groove part 56B coupled to the second communication hole 55B, a third groove part 56C coupled to the third communication hole 55C, and a fourth groove part 56D coupled to the fourth communication hole 55D are formed at the bottom surface 51 of the barrel 50c. A first supply port 25A supplying the material to the first groove part 56A, a second supply port 25B supplying the material to the second groove part 56B, a third supply port 25C supplying the material to the third groove part 56C, and a fourth supply port 25D supplying the material to the fourth groove part 56D are formed at a part forming the sidewall surface 52 of the barrel 50c. The other configurations are the same as in the second embodiment unless stated otherwise. In FIG. 7, the groove parts 56A, 56B, 56C, 56D are hatched in order to facilitate understanding of the technology.

The first groove part 56A has a first center part 151A, a first spiral part 152A, and a first material inflow part 153A. The first center part 151A is a circular depression around the first communication hole 55A. One end of the first spiral part 152A is coupled to the first communication hole 55A via the first center part 151A. The first spiral part 152A spirally extends about the first center part 151A in such a way as to form an arc toward the outer circumference of the bottom surface 51. The other end of the first spiral part 152A is coupled to the first material inflow part 153A. The first material inflow part 153A is a groove-like part provided at the outer circumferential edge of the bottom surface 51 and wider than the first spiral part 152A. The first supply port 25A is arranged at the slope part 53 above the first material inflow part 153A.

The second groove part 56B has a second center part 151B, a second spiral part 152B, and a second material inflow part 153B. The second groove part 56B has the shape of the first groove part 56A rotated clockwise by 90 degrees about the center of the bottom surface 51. The second supply port 25B communicating with the material supply unit 20 is arranged at the slope part 53 above the second material inflow part 153B.

The third groove part 56C has a third center part 151C, a third spiral part 152C, and a third material inflow part 153C. The third groove part 56C has the shape of the second groove part 56B rotated clockwise by 90 degrees about the center of the bottom surface 51. The third supply port 25C communicating with the material supply unit 20 is arranged at the slope part 53 above the third material inflow part 153C.

The fourth groove part 56D has a fourth center part 151D, a fourth spiral part 152D, and a fourth material inflow part 153D. The fourth groove part 56D has the shape of the third groove part 56C rotated clockwise by 90 degrees about the center of the bottom surface 51. The fourth supply port 25D communicating with the material supply unit 20 is arranged at the slope part 53 above the fourth material inflow part 153D.

In this embodiment, the material supply unit 20 and the respective supply ports 25A, 25B, 25C, 25D are coupled together via four supply paths 22A, 22B, 22C, 22D. Also, four material supply units 20 may be provided, and the respective supply ports 25A, 25B, 25C, 25D may communicate with the respective material supply units 20 via the respective supply paths 22A, 22B, 22C, 22D. For example, the first supply port 25A may communicate with a first material supply unit via the first supply path 22A. The second supply port 25B may communicate with a second material supply unit via the second supply path 22B. The third supply port 25C may communicate with a third material supply unit via the third supply path 22C. The fourth supply port 25D may communicate with a fourth material supply unit via the fourth supply path 22D. Different types of materials may be accommodated in the respective material supply units 20.

In the three-dimensional shaping device 100c in this embodiment described above, each supply port 25A, 25B, 25C, 25D is arranged at the slope part 53 above each material inflow part 153A, 153B, 153C, 153D. This enables the material to be supplied into the supply space 59 from a position near each material inflow part 153A, 153B, 153C, 153D and therefore enables the material to flow into each material inflow part 153A, 153B, 153C, 153D more easily.

D. Other Embodiments (D1) In the three-dimensional shaping devices 100, 100b, 100c in the above embodiments, the blade part 43 of the flat screw 40 is provided parallel to the rotation axis RX. However, the blade part 43 may have a surface sloped with respect to the rotation axis RX. Specifically, the surface of the blade part 43 at the front side in the direction of rotation of the flat screw 40 may be sloped with respect to the rotation axis RX in such a way that the material is pushed out toward the end surface 45 when the material comes in contact with the surface at the front side in the direction of rotation of the flat screw 40, of the blade part 43 of the rotating flat screw 40. In this case, the blade part 43 of the rotating flat screw 40 can pressure-feed the material between the flat screw 40 and the barrel 50 toward the bottom surface 51 of the barrel 50. This can further facilitate the supply of the material to the groove part 56.

(D2) In the three-dimensional shaping devices 100, 100b, 100c in the above embodiments, the cross-sectional area of the spiral part 152 is constant. However, the cross-sectional area of the spiral part 152 may become smaller as it goes toward the communication hole 55. For example, the spiral part 152 may be formed with a width decreasing as it goes toward the communication hole 55, or may be formed with a depth decreasing as it goes toward the communication hole 55. In this case, the pressure of the shaping material pressure-fed into the communication hole 55 from inside the spiral part 152 can be increased.

(D3) In the three-dimensional shaping devices 100, 100b, 100c in the above embodiments, the flat screw 40 has the blade part 43. However, the flat screw 40 may not have the blade part 43. Even in this case, the material can be continuously supplied to the groove part 56.

(D4) In the three-dimensional shaping devices 100, 100b, 100c in the above embodiments, the sidewall surface 52 has the slope part 53. However, the sidewall surface 52 may not have the slope part 53. Even in this case, the material can be continuously supplied from the supply space 59 to the groove part 56.

(D5) In the three-dimensional shaping device 100b in the above second embodiment, the length Ln1 of the first nozzle hole 61A and the length Ln2 of the second nozzle hole 61B are the same. However, the length Ln1 of the first nozzle hole 61A and the length Ln2 of the second nozzle hole 61B may be different from each other. For example, the length Ln1 of the first nozzle hole 61A may be longer than the length Ln2 of the second nozzle hole 61B.

Figure 8:
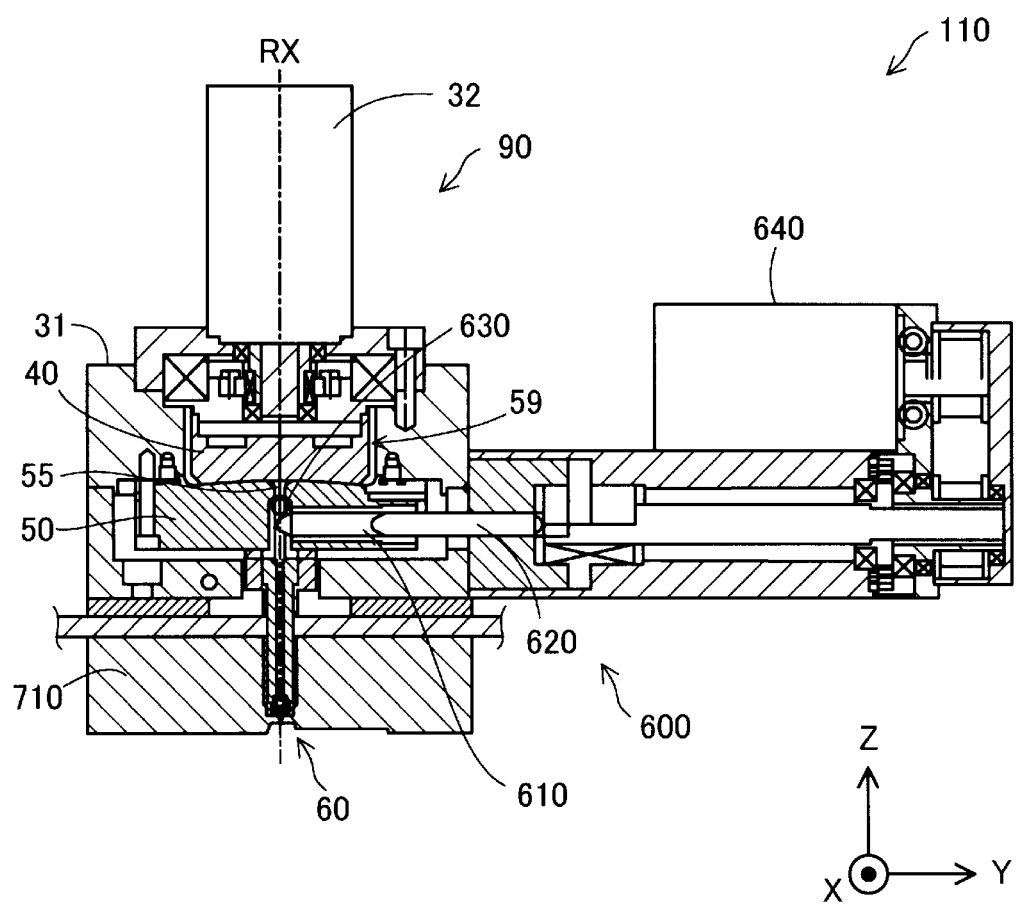
FIG. 8 is an explanatory view showing a schematic configuration of an injection molding device in another form.

(D6) FIG. 8 is an explanatory view showing a schematic configuration of an injection molding device 110 as another form. An ejection unit 200d may be used in the injection molding device 110 as well as in the three-dimensional shaping devices 100, 100b, 100c. In the injection molding device 110 shown in FIG. 8, the ejection unit 200d has an injection unit 600 in addition to the plasticizing device 90 and the nozzle unit 60. The configuration and functions of the plasticizing device 90 are as described above. In FIG. 8, the illustration of the material supply unit 20 and the supply path 22 is omitted. The injection unit 600 measures the molten material supplied from the plasticizing device 90 and injects the material from the nozzle unit 60 into a space demarcated by an upper mold 710 and a lower mold, not illustrated, in a mold-clamped state. The injection unit 600 has an injection cylinder 610, an injection plunger 620, a check valve 630, and an injection motor 640. As the injection motor 640 drives the injection plunger 620 to slide to the side opposite to the side of the communication hole 55, the molten material in the communication hole 55 is drawn into the injection cylinder 610 and measured. As the injection motor 640 drives the injection plunger 620 to slide toward the communication hole 55, the molten material in the injection cylinder 610 is pressure-fed toward the nozzle unit 60 and injected into the space demarcated by the upper mold 710 and the lower mold.

E. Other Forms

The present disclosure is not limited to the foregoing embodiments and can be implemented in various forms without departing from the spirit and scope of the present disclosure. For example, the present disclosure can be implemented in the following forms. A technical feature in the embodiments corresponding to a technical feature in each of the following forms can be replaced or combined with another according to need, in order to solve apart or all of the problems in the present disclosure or in order to achieve a part or all of the effects of the present disclosure. Also, the technical feature can be deleted where appropriate, unless described as essential in this specification.

(1) According to a first aspect of the present disclosure, a plasticizing device plasticizing a material into a molten material is provided. The plasticizing device includes: a drive motor; a rotating unit driven to rotate about a rotation axis by the drive motor and having an end surface perpendicular to the rotation axis and a lateral surface intersecting with the end surface; a barrel having a bottom surface facing the end surface of the rotating unit, and a heater; a case accommodating the rotating unit; and a material supply unit accommodating the material. At least one of the barrel and the case has a sidewall surface facing the lateral surface of the rotating unit and standing up along an outer circumference of the bottom surface of the barrel. At the bottom surface of the barrel, a communication hole through which the molten material flows out and a spiral groove part coupled to the communication hole are formed. The lateral surface of the rotating unit and the sidewall surface together define a supply space where the material is supplied from the material supply unit to the groove part.

In the plasticizing device of this configuration, the material can be continuously supplied to the groove part. Therefore, a change in the pressure of the molten material pressure-fed into the communication hole can be restrained. Thus, a change in the flow rate of the molten material ejected from the communication hole can be restrained.

(2) In the plasticizing device according to the above aspect, the sidewall surface may have a supply port through which the material supply unit and the supply space communicate with each other. The material may travel through the supply port and flow into the supply space.

In the plasticizing device of this configuration, the material can be supplied from a position near the groove part. This can facilitate the supply of the material to the groove part.

(3) In the plasticizing device according to the above aspect, the rotating unit may have a plurality of plate-like blade parts protruding from the lateral surface toward the supply space. The material may travel between the blade parts and flow into the groove part.

In the plasticizing device of this configuration, the blade parts of the rotating unit that is rotating can stir the material between the rotating unit and the barrel. Therefore, the material can be retrained from adhering to the barrel and closing the space between the rotating unit and the barrel.

(4) In the plasticizing device according to the above aspect, the blade parts may have a surface sloped along the rotation axis.

In the plasticizing device of this configuration, the blade parts can pressure-feed the material between the rotating unit and the barrel to the bottom surface of the barrel. This can facilitate the supply of the material to the groove part.

(5) In the plasticizing device according to the above aspect, the sidewall surface may have, at a position intersecting with the bottom surface, a slope part sloped in such a way as to approach a center of the bottom surface as it goes toward the bottom surface.

In the plasticizing device of this configuration, a flow of the material along the slope part toward the groove part can be formed. This can facilitate the supply of the material to the groove part.

(6) In the plasticizing device according to the above aspect, the groove part may be reduced in cross-sectional area as it goes toward the communication hole.

In the plasticizing device of this configuration, the pressure of the molten material pressure-fed from inside the groove part into the communication hole can be increased.

(7) According to a second aspect of the present disclosure, a three-dimensional shaping device is provided. The three-dimensional shaping device includes: a nozzle ejecting a shaping material; a plasticizing device plasticizing a material into the shaping material and supplying the shaping material to the nozzle; and a control unit controlling the plasticizing device. The plasticizing device includes: a drive motor; a rotating unit driven to rotate about a rotation axis by the drive motor and having an end surface perpendicular to the rotation axis and a lateral surface intersecting with the end surface; a barrel having a bottom surface facing the end surface of the rotating unit, and a heater; a case accommodating the rotating unit; and a material supply unit accommodating the material. At least one of the barrel and the case has a sidewall surface facing the lateral surface of the rotating unit and standing up along an outer circumference of the bottom surface of the barrel. At the bottom surface of the barrel, a communication hole through which the shaping material flows out into the nozzle and a spiral groove part coupled to the communication hole are formed. The lateral surface of the rotating unit and the sidewall surface together define a supply space where the material is supplied from the material supply unit to the groove part.

In the three-dimensional shaping device of this configuration, the material can be continuously supplied to the groove part. Therefore, a change in the pressure of the shaping material pressure-fed into the communication hole can be restrained. Thus, a change in the flow rate of the shaping material ejected from the communication hole can be restrained.

The present disclosure can be implemented in various forms other than the plasticizing device. For example, the present disclosure can be implemented as a three-dimensional shaping device, an ejection unit, and the like.

What is claimed is:
1. A plasticizing device plasticizing a material into a molten material, the plasticizing device comprising:
   a drive motor;
   a rotating unit driven to rotate about a rotation axis by the drive motor and having an end surface perpendicular to the rotation axis and a lateral surface intersecting with the end surface, the rotating unit being a cylindrical body that extends outward from an annular plate, the cylindrical surface of the cylindrical body defining the lateral surface, and the rotating unit including a plurality of blades that extend outward from the cylindrical body that each extend along an entire length of the cylindrical body;
   a barrel having a bottom surface facing the end surface of the rotating unit, and a heater;
   a case accommodating the rotating unit; and
   a material supply unit accommodating the material, wherein
   at least one of the barrel and the case has a sidewall surface facing the lateral surface of the rotating unit and standing up along an outer circumference of the bottom surface of the barrel, at the bottom surface of the barrel, a communication hole through which the molten material flows out and a spiral groove part coupled to the communication hole are formed, and the lateral surface of the rotating unit and the sidewall surface together define a supply space where the material is supplied from the material supply unit to the groove part.

2. The plasticizing device according to claim 1, wherein the sidewall surface has a supply port though which the material supply unit and the supply space communicate with each other, and the material travels through the supply port and flows into the supply space.

3. The plasticizing device according to claim 1, wherein the blades protrude from the lateral surface toward the supply space, and the material travels between the blades and flows into the groove part.

4. The plasticizing device according to claim 3, wherein the blades each have a surface sloped along the rotation axis.

5. The plasticizing device according to claim 1, wherein the sidewall surface has, at a position intersecting with the bottom surface, a slope part sloped in such a way as to approach a center of the bottom surface as it goes toward the bottom surface.

6. The plasticizing device according to claim 1, wherein the groove part is reduced in cross-sectional area as it goes toward the communication hole.

7. A three-dimensional shaping device comprising:
a nozzle ejecting a shaping material;
a plasticizing device plasticizing a material into the shaping material and supplying the shaping material to the nozzle; and
a control unit controlling the plasticizing device,
the plasticizing device comprising:
   a drive motor;
   a rotating unit driven to rotate about a rotation axis by the drive motor and having an end surface perpendicular to the rotation axis and a lateral surface intersecting with the end surface, the rotating unit being a cylindrical body that extends outward from an annular plate, the cylindrical surface of the cylindrical body defining the lateral surface, and the rotating unit including a plurality of blades that extend outward from the cylindrical body that each extend along an entire length of the cylindrical body;
   a barrel having a bottom surface facing the end surface of the rotating unit, and a heater;
   a case accommodating the rotating unit; and
   a material supply unit accommodating the material, wherein
at least one of the barrel and the case has a sidewall surface facing the lateral surface of the rotating unit and standing up along an outer circumference of the bottom surface of the barrel,
at the bottom surface of the barrel, a communication hole through which the shaping material flows out into the nozzle and a spiral groove part coupled to the communication hole are formed, and
the lateral surface of the rotating unit and the sidewall surface together define a supply space where the material is supplied from the material supply unit to the groove part.

* * * * *